Patented Mar. 17, 1936

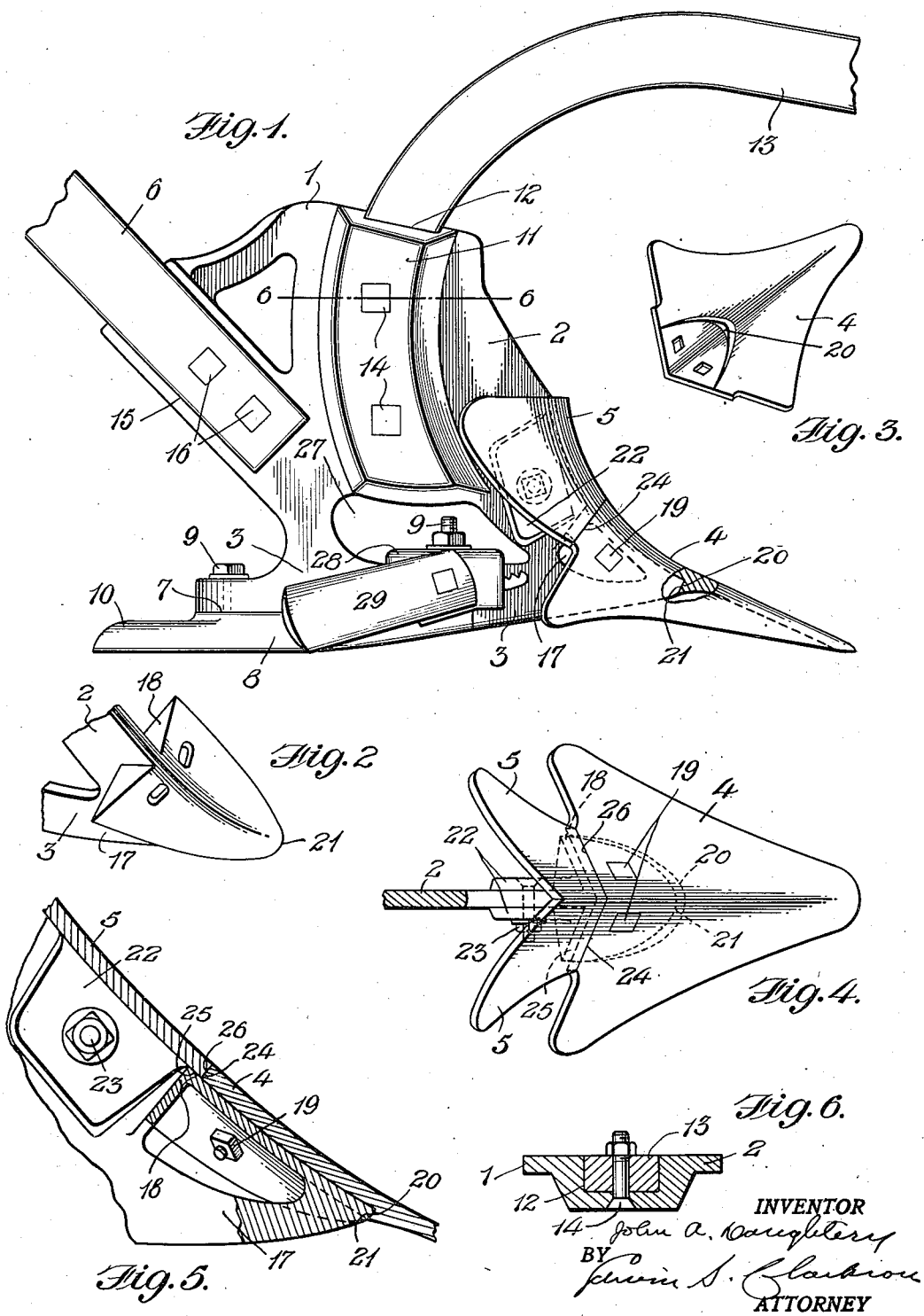

2,034,461

UNITED STATES PATENT OFFICE 2,034,461

PLOW

John A. Daughtery, Goldsboro, N. C., assignor, by mesne assignments, to Hugh W. Davis, Norfolk, Va., as trustee Application May 14, 1935, Serial No. 21,447

2 Claims. (Cl. 97—113)

This invention relates to improvements in plows of that type having a double point and a double moldboard, and has particular reference to a construction for increasing the general stability and strength of the plow and the working parts thereof without increase of weight, while also increasing the general efficiency and durability of the plow and its capability of use in cultivation without injury to growing plants.

One object is to provide a plow having a novel construction and arrangement of runner shoe giving greater stability and ease of running travel to the plow.

Another object of the invention is to provide a novel and improved mounting for the plow point and moldboard to give greater strength to these parts and to reinforce the lower portion of the plow point against longitudinal strains and the upper portion of the plow point and the moldboard against both longitudinal and transverse strains.

Still another object of the invention is to provide a novel mode of bolting the plow standard and beam whereby a smooth surface is presented on the plant side of the standard to prevent damage to cultivated plants.

Still another object of the invention is to provide for the mounting of sweeps in such manner as to better and more efficiently throw the earth toward growing plants.

Still another object of the invention is to generally simplify and improve the construction and increase the efficiency of plows of this character.

The invention consists of the features of construction, combination and arrangement of parts, hereinafter fully described and claimed, reference being had to the accompanying drawing, in which:—

Fig. 1 is a perspective view, partly broken away in section, looking toward one side of a plow embodying my invention.

Fig. 2 is a perspective view of a portion of the plow standard.

Fig. 3 is a rear perspective view of the plow point.

Fig. 4 is a sectional plan view taken substantially on line 4—4 of Fig. 1.

Fig. 5 is a vertical section through the standard, plow point and moldboard.

Fig. 6 is a detail section on line 6—6 of Fig. 1.

Referring now more particularly to the drawing, 1 designates generally a plow of the character described embodying my invention, 2 the plow standard, 3 the plow runner, 4 the plow point, 5 the moldboards, and 6 the plow handle.

The standard 2 comprises a casting of suitable general form which is provided at its base with the runner portion 3, which runner portion is recessed, as at 7, in rear of the vertical plane of the moldboard to receive a wear shoe 8, secured thereto by front and rear bolts or other suitable fastenings 9. This shoe has a tail prolongation 10 extending some distance in rear of the heel end of the runner 3 so as to increase the longitudinal extent of the runner surface, thus greatly promoting the stability and ease of running action of the plow over the ground. The standard 2 is also provided at one side with an embossed portion 11 forming at its opposite side a recess 12 to receive the depending rear end of the plow beam 13, which is secured thereto by bolts 14. The heads of these bolts are countersunk in the face of the boss 11 which lies on the plant side of the plow, the projecting ends of the bolts and securing nuts thereon being thereby disposed at the opposite side of the plow, so that the bossed part 11 presents a smooth surface for contact with growing plants to prevent injury thereto in the travel of the plow. The standard is formed at its rear with recesses 15 on opposite sides thereof to receive the lower ends of the plow handles 6, which are secured thereto by bolts 16, the heads of which bolts are countersunk in the handle on the plant side of the plow so that any plants coming in contact therewith will not be damaged. The arrangement is such, however, that the handle on the plant side lies wholly inside the plane of the boss 11, which thus acts as a fender or guard to brush aside the plants without injury thereto.

Adjacent to its forward end or toe portion the standard is provided with a substantially triangular part in the form of a substantially triangular bracket 17 composed of wing-like members projecting equidistantly beyond opposite sides thereof at an upward and outward angle of inclination, said wings terminating at their upper edges in horizontal transverse triangular shaped abutment shoulders 18. The upper rear portion of the plow point 4 is disposed above said portion of the standard and rests upon the wings of the bracket 17 and is secured thereto by bolts 19. The inner side of the point 4 is formed with a dove-tailed, beveled or undercut recess 20 receiving the toe part 21 of the standard which is shaped to fit the same, said recess and toe part 21 thus presenting undercut or inclined abutment surfaces which lock the forward portion of the point from any tendency to upward movement and provide an interlocking connection between the point and standard which lies substantially in the horizontal plane of the runner, whereby the point is braced effectually against logitudinal strains. By this means the connection between the plow point and the standard is materially strengthened without the use of auxiliary or complex reinforcing or fastening connections.

The moldboard 5 comprises two wings or sections each of which is formed with a rearwardly extending lug 22, the lugs 22 of the moldboard wings being arranged to lie on opposite sides of the forward portion of the standard and being secured thereto by bolts 23. As shown, the upper rear portion of the plow point 4 terminates in a transverse shoulder 24 which is disposed to lie below the shoulder 18 of the bracket 17 so that the upper portion of the face of the bracket 17 is thus arranged to provide a forward abutment surface 25 against which the lower portion of the moldboard 5 rests, thus bracing the moldboard at this point against both longitudinal and transverse strains. The lower edge of the moldboard preferably is formed with a transverse abutment face 26 conforming to the abutment edge 24 of the point 4 and engaging the same, whereby the parts 4 and 5 are further braced against both longitudinal and transverse strains. The lower edges of the forward portions of the brackets 22 may be arranged to bear on the abutment surface 18 to still further increase the security of the connection of the moldboard with the standard. It will thus be seen that by these modes of applying and securing the plow points and moldboard in position such parts, while fastened in place in a simple manner, are firmly supported against loosening or displacement under all working strains without employing complex fastening and reinforcing connections or adding objectionable weight to the plow structure.

In the center of the lower portion of the standard just above the runner is formed a transverse opening 27 through which extends a saddle bracket or fixture 28, which is adjustably secured to the runner by the front bolt 9 which secures the forward end of the shoe 8 in position. To this bracket 28 are secured the sweeps 29, one located at each side of the plow, which extend rearwardly at an outward and downward working angle. By this arrangement and mode of attaching the sweeps such sweeps are disposed above the horizontal plane of the cutting edge of the point 4, thus adapting the sweeps to more thoroughly and effectually throw the earth outward against the growing plants.

From the foregoing description, taken in connection with the drawing, the construction and advantage of my improved plow structure will be readily understood by those versed in the art without a further and extended description, and it will be seen that the invention provides a plow in which the working parts are so mounted and braced as to be effectually reinforced against all working strains, and that the construction is further such as to greatly increase the stability and general strength of the plow, while obtaining other material and important advantages as hereinafter set forth. While the structure shown is preferred, it will, of course, be understood that changes in the form, arrangement and details of construction of the parts may be made within the scope of the appended claims, without departing from the spirit or sacrificing any of the advantages of the invention.

What I claim is:—

1. A plow having a standard terminating in a toe portion and provided with a bracket member formed integral with the standard and having oppositely extending wings, said wings being formed at their upper edges with transverse shoulders, a double plow point of substantially V-shaped cross-section resting on said wings of the bracket member and receiving the toe portion of the standard, said plow point having an upper abutment edge terminating below the upper edge of the bracket member, and a substantially V-shaped mold board secured to the standard and having a lower abutment edge bearing against the upper abutment edge of the plow point and lapping over upon the upper edges of the wings of the bracket member.

2. A plow having a standard terminating in a beveled or undercut toe portion and provided with a substantially V-shaped bracket member formed integral therewith and having wings extending beyond opposite sides thereof, said wings terminating at their upper edges in transverse abutment shoulders, a double plow point of substantially V-shaped cross-section resting on the bracket wings, said plow point being provided with a beveled or undercut recess receiving the beveled or undercut toe portion of the standard, fastening means connecting the plow point with the bracket wings, said plow point being provided with an upper transverse abutment edge terminating below the abutment shoulders of the bracket, and a double mold board secured to the standard and having a lower abutment edge bearing against the upper abutment edge of the plow point and lapping over upon the upper portions of the bracket wings.

JOHN A. DAUGHTERY.